(12) United States Patent
Lee et al.

(10) Patent No.: US 6,989,547 B2
(45) Date of Patent: Jan. 24, 2006

(54) METHOD AND APPARATUS FOR DISCRIMINATING LATENT FINGERPRINT IN OPTICAL FINGERPRINT INPUT APPARATUS

(75) Inventors: Hwi-Seok Lee, Sungnam (KR); Soon-Won Jung, Seoul (KR); Jae-Hyun Jun, Sungnam (KR)

(73) Assignee: NITGEN Co., Ltd, Seoul (KR)

( * ) Notice: Subject to any disclaimer, the term of this patent is extended or adjusted under 35 U.S.C. 154(b) by 0 days.

(21) Appl. No.: 11/067,792

(22) Filed: Feb. 28, 2005

(65) Prior Publication Data

US 2005/0141755 A1 Jun. 30, 2005

Related U.S. Application Data (62) Division of application No. 10/258,455, filed as application No. PCT/KR01/00708 on Apr. 27, 2001, now Pat. No. 6,885,017.

(30) Foreign Application Priority Data

Apr. 29, 2000 (KR) ...................... 10-2000-0023151

(51) Int. Cl.
  *G06K 11/00* (2006.01)
  *G06K 5/00* (2006.01)
(52) U.S. Cl. ...................... 250/556; 382/124; 340/5.83
(58) Field of Classification Search ................ 250/556; 382/124; 340/5.83; 283/78
See application file for complete search history.

(56) References Cited

U.S. PATENT DOCUMENTS

| | | | | |
|---|---|---|---|---|
| 4,728,186 A * | 3/1988 | Eguchi et al. | ................. | 356/71 |
| 5,629,764 A * | 5/1997 | Bahuguna et al. | ............ | 356/71 |
| 6,125,192 A * | 9/2000 | Bjorn et al. | ................. | 382/124 |
| 6,292,576 B1 * | 9/2001 | Brownlee | .................... | 382/124 |
| 6,526,396 B1 * | 2/2003 | Hiratsuka et al. | ............. | 706/52 |

* cited by examiner

*Primary Examiner*—David Porta
*Assistant Examiner*—Seung C. Sohn
(74) *Attorney, Agent, or Firm*—G W i P S

(57) ABSTRACT

A method and an apparatus for distinguishing a latent fingerprint is provided to prevent a fingerprint recognition apparatus from mis-recognizing a latent fingerprint as a fingerprint of a biomass due to a fingerprint residual on an imaging surface of an optical fingerprint input apparatus. According to the present invention, there is provided a backlight control device for controlling switching on and off of the backlight; an image acquisition device for acquiring a fingerprint image without illuminating the backlight onto the imaging surface; a fingerprint detection device for detecting the existence of a fingerprint from the image acquired by the image acquisition device; and a device for determining that the fingerprint, if detected by the fingerprint detection device, is a latent fingerprint detected due to an external light.

10 Claims, 11 Drawing Sheets

METHOD AND APPARATUS FOR DISCRIMINATING LATENT FINGERPRINT IN OPTICAL FINGERPRINT INPUT APPARATUS

This is a divisional of Ser. No. 10/258,455, filed Oct. 24, 2002, now U.S. Pat. No. 6,885,017, which is a 371 of PCT/KR01/00708, filed Apr. 27, 2001.

BACKGROUND OF THE INVENTION

1. Field of the Invention

This invention relates to a method and an apparatus for distinguishing a latent fingerprint from a fingerprint of a biomass. Particularly, the method can prevent a fingerprint recognition device from mis-recognizing a latent fingerprint as a fingerprint of a biomass due to a fingerprint residual on the imaging surface of an optical fingerprint input apparatus.

2. Description of the Prior Art

A fingerprint recognition device can be utilized on a wide scale as a device for comparing and recognizing fingerprints between an inputted fingerprint and a pre-registered fingerprint. A fingerprint recognition device is used as a locking mechanism of a door or a safe, access control to a gate, attendance control of employees, access control to a computer, or various other controls. The fingerprint input apparatuses for receiving fingerprints to perform fingerprint recognition are mainly classified into two types: an optical type and a non-optical type. The fingerprint recognition device employing an optical fingerprint input apparatus is a device that initially illuminates a fingerprint laid on a prism, interprets the fingerprint image reflected according to the shapes of valleys or ridges of the fingerprint and formed on an image sensor, and then compares the interpreted image with a pre-stored fingerprint.

The optical fingerprint input apparatuses are mainly classified into an absorption type and a scattering type.

Figure 1:
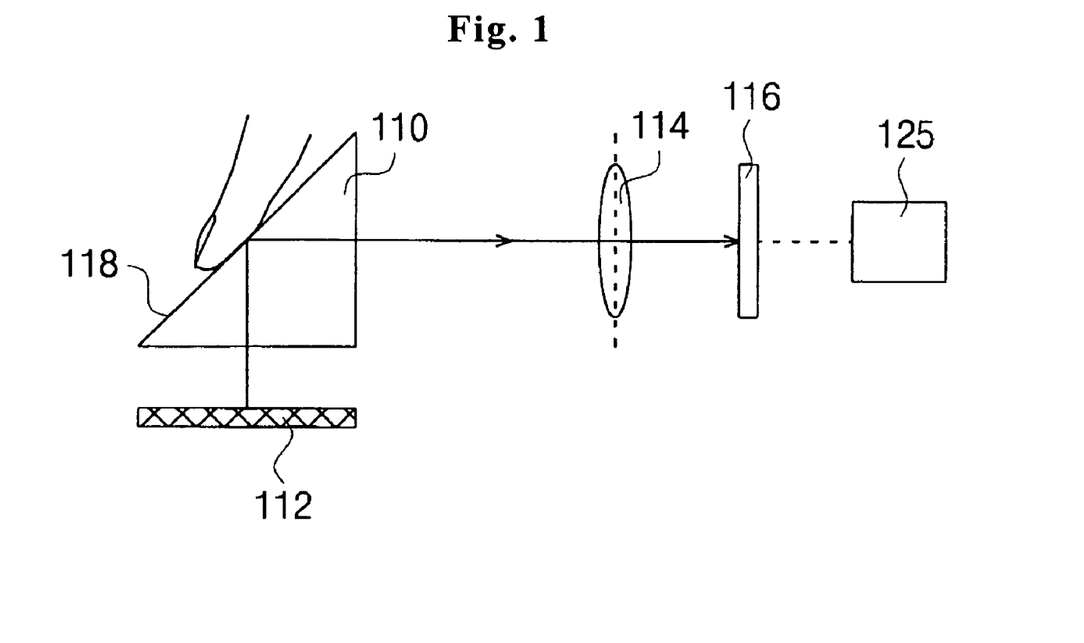
FIG. 1 is a schematic diagram illustrating an operational principle of a fingerprint input apparatus of an absorption type.

FIG. 1 is a schematic diagram illustrating an operational principle of a fingerprint input apparatus of an absorption type, which comprises a backlight 112, a triangular prism 110, a lens 114, an image sensor 116, and an image processor 125. The backlight 112 uses a plurality of LED aligned. The triangular prism 110 is a prism of a right triangular shape that generates a total reflection inside an imaging surface when no fingerprint is inputted. The image sensor 116 is an element outputting electric signals corresponding to an amount of inputted light, such as a CCD or a CMOS sensor, well known to those skilled in the art. The inclined surface of the triangular prism 110 is an imaging surface, while an internal plane of the imaging surface 118 is a total reflection surface causing the total reflection.

Under no input of a fingerprint to the imaging surface 118, the light originating from the backlight 112 is totally reflected from inside the imaging surface of the triangular prism 110, and is incident on the image sensor 116 through the lens 114. If a finger is laid on the imaging surface, the light illuminated onto the valleys of the fingerprint is totally reflected from the internal surface of the imaging surface 118 and reaches the image sensor 116 because the valleys of the fingerprint are not in contact with the imaging surface. By contrast, the light illuminated onto the ridges of the fingerprint is not totally reflected from the internal surface of the imaging surface 118 but rather, only a part of the reflection reaches the image sensor 116.

Accordingly, the amounts of light incident on the image sensor 116 differ between the valleys and the ridges, and as a consequence, the image sensor 116 outputs electric signals of different levels depending on a pattern of a fingerprint. The image processor 125 formulates the output values of the image sensor 116 into digital signals so as to recognize a fingerprint pattern.

Figure 2A:
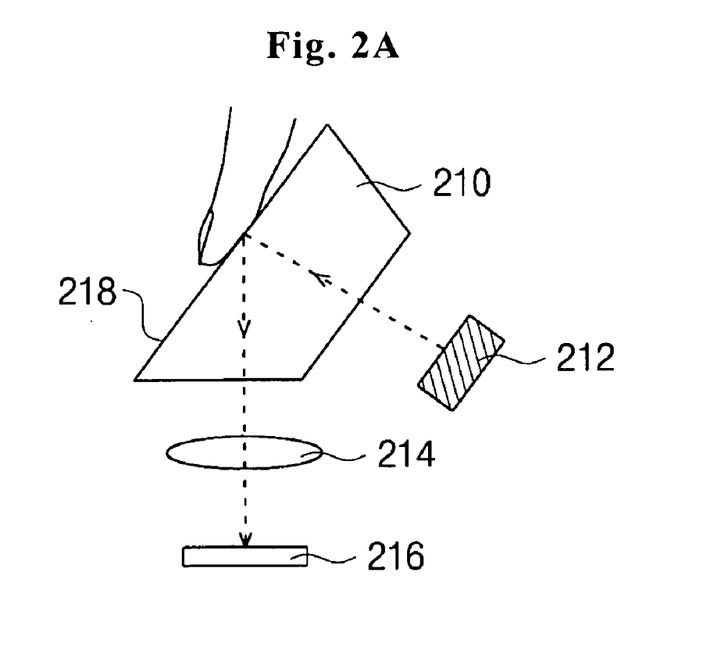
FIGS. 2A and 2B are schematic diagrams illustrating operational principles of a fingerprint input apparatus of an absorption type.
Figure 2B:
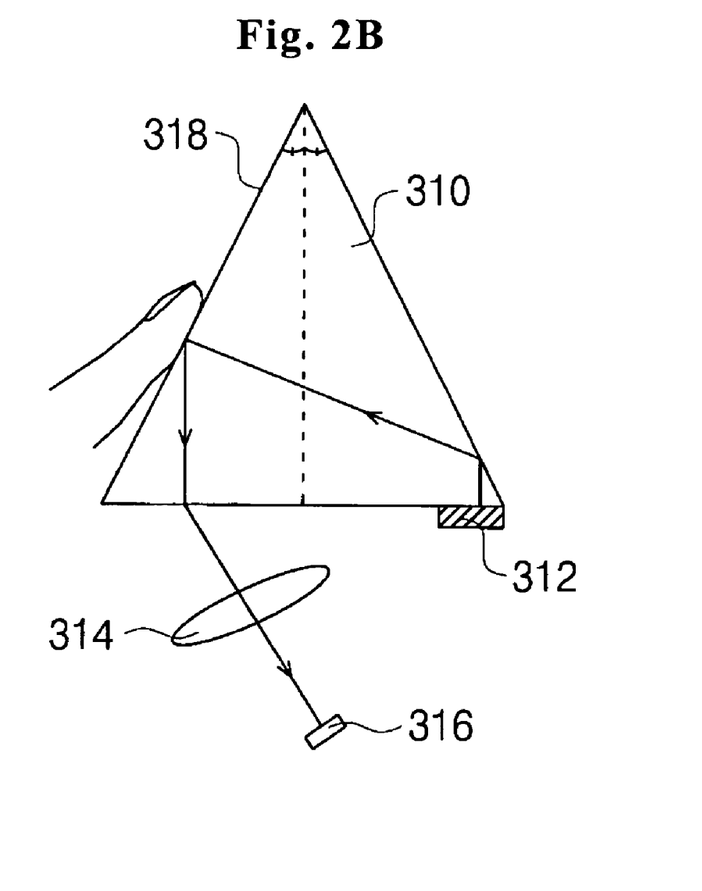

FIGS. 2A and 2B are schematic diagrams illustrating an operational principle of a fingerprint input apparatus of a scattering type.

The fingerprint input apparatus in FIG. 2A comprises a backlight 212, a prism 210, a lens 214, and an image sensor 216 with a similar construction to the one in FIG. 1. However, the prism 210 is of a ladder shape rather than a triangular shape. Unlike the absorption type shown in FIG. 1, the light is incident on the imaging surface 218 of the prism 210 from the backlight 211 at an angle far smaller than the right angle or a critical angle. Therefore, the light illuminated onto the valleys of the fingerprint not in contact with the imaging surface 218 penetrates the imaging surface 218 and does not reach the image sensor 216. Meanwhile, the light illuminated onto the ridges of the fingerprint is scattered by the ridges. The scattered light is incident on the lens 214 and is sensed by the image sensor 216.

FIG. 2B is a schematic diagram illustrating an operational principle of the fingerprint input apparatus of another scattering type. As in the case of FIG. 2A, the light illuminated onto the valleys of a fingerprint penetrates the imaging surface 318 and does not reach the image sensor 316. The light illuminated onto the ridges of the fingerprint is scattered by the same principle. However, the difference lies in using a prism of an isosceles triangular shape and changing the position of the backlight 312.

In case of the fingerprint input apparatus of an absorption type, the light is absorbed at the ridges of a fingerprint. Therefore, the image of the fingerprint appearing on the image sensor is dark at the ridges and bright at the valleys. In case of the fingerprint input apparatus of a scattering type, however, the light is scattered at the ridges of a fingerprint. Therefore, the image of the fingerprint appearing on the image sensor is a bright image at the ridges and dark at the valleys, thereby reflecting a comprehensively contrary image to that of the fingerprint input apparatus of an absorption type. To facilitate processing the fingerprint image as well as to avoid an inversion of bright and dark images of a fingerprint appearing on a monitor of a computer depending on the input methods, an inversed image is displayed on the monitor of a computer in the case of the fingerprint input apparatus of a scattering type. To be specific, although the actual fingerprint image appearing on the image sensor is bright at the ridges and dark at the valleys of the fingerprint, the gray level in the course of processing the fingerprint image has a low value at the ridges and a high value at the valleys as in the case of the fingerprint input apparatus of an absorption type.

In case of the optical fingerprint input apparatus, however, sebum or a contaminated material leaves a latent fingerprint on the fingerprint recognition apparatus due to contact with a person's finger. If a light is incident on the imaging surface from an external light, rather than from a backlight, at a particular angle, the image sensor is apt to sense a latent fingerprint. Thus, if the image sensor senses any latent fingerprint, the fingerprint recognition apparatus mis-recognizes the latent fingerprint as a fingerprint of a biomass. This causes a problem in that an unauthorized user may be authenticated for access by using the latent fingerprint left on the fingerprint recognition apparatus instead of inputting his or her own fingerprint.

Figure 3A:
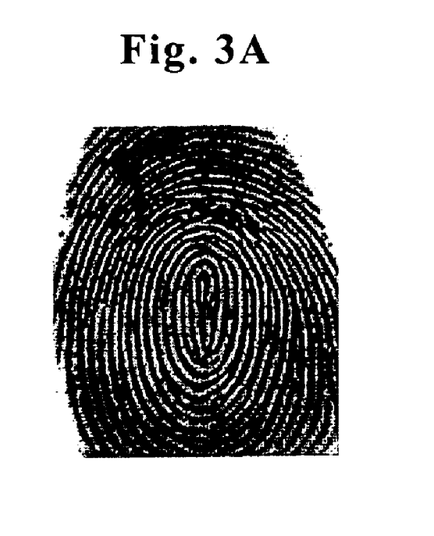
FIGS. 3A to 3C are exemplary patterns of a normal fingerprint and a latent fingerprint.
Figure 3B:
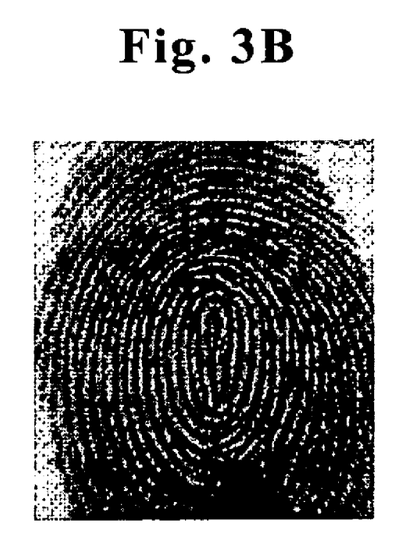
Figure 3C:
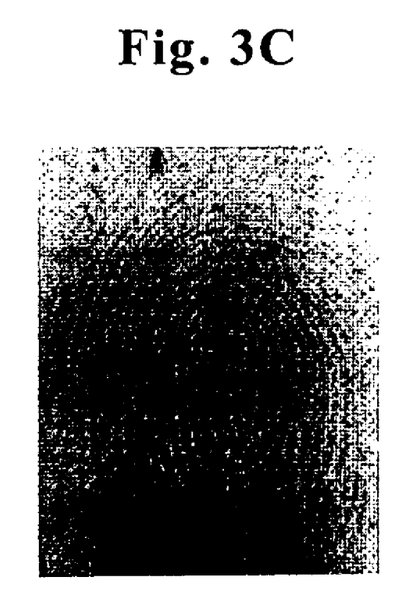

FIG. 3A shows an image of a normal fingerprint of a biomass, and FIG. 3B shows a clear image of a latent fingerprint, which is quite similar to the one in FIG. 3A. FIG. 3C shows a vague image of a latent fingerprint.

To solve the problem of mis-recognizing a latent fingerprint, the conventional art uses a method of storing the most recently inputted fingerprint of a person, comparing the stored fingerprint with the currently inputted fingerprint, and distinguishes the newly inputted fingerprint from the fingerprint of a biomass as a latent fingerprint if the two fingerprints are quite similar (i.e., when the positions of a particular point of the two fingerprints coincide with each other or when comprehensive patterns of the two fingerprints overlap with each other).

However, this method still poses a problem in that a pattern of the latent fingerprint read by the image sensor is variable due to a change of the external light, and due to other factors, and the stored pattern may be distinguished as different from the latent fingerprint. The image sensor therefore may fail to discriminate a latent fingerprint from a biomass fingerprint accurately.

SUMMARY OF THE INVENTION

The present invention was conceived by the insight that a latent fingerprint can be detected due to an external light even when the backlight is off and not illuminated onto the fingerprint in the fingerprint input apparatus of an optical type.

It is, therefore, an object of the present invention to provide a method and an apparatus for discriminating a latent fingerprint from that of a biomass. The present invention enables one to discriminate between fingerprints as either being latent or biomass by acquiring an image without illuminating a backlight onto an imaging surface and identifying it as a latent fingerprint detected due to an external light.

To achieve the above object, this invention provides a method of determining a latent fingerprint in an optical fingerprint input apparatus. The method comprises the steps of: acquiring an image without illuminating a backlight onto an imaging surface; detecting the existence of a fingerprint from the acquired image; and determining a detected fingerprint is a latent fingerprint detected due to an external light.

The present invention also provides an apparatus for detecting a latent fingerprint in an optical fingerprint input apparatus. The apparatus comprises: a backlight control means for controlling on/off of the backlight; an image acquisition means for acquiring a fingerprint image without illuminating a backlight onto an imaging surface under a control by the backlight-control means; a fingerprint detection means for detecting the existence of a fingerprint from the image acquired by the image acquisition means; and a latent fingerprint discrimination means for discriminating a fingerprint detected by the fingerprint detection means as a latent fingerprint detected due to an external light.

In the method and apparatus for detecting a latent fingerprint, a method of acquiring an entire frame of an image can be considered as a method of acquiring an image. When the backlight is in the "off" state, an entire frame of an image is acquired and stored in memory so that the existence of a latent fingerprint can be detected for the stored image.

However, use of the above method of acquiring an image wastes time by requiring an entire frame of an image to detect a latent fingerprint. Therefore, time can be saved if a latent fingerprint is detected by acquiring a partial frame of a fingerprint image without illuminating the backlight and by using the partial frame of the image.

Here, in cases where a finger is small or when a fingerprint is in contact with a lower part of the imaging surface, it is desirable to acquire a fingerprint image of about ¼ to ½ from the tip of the fingerprint image.

Meanwhile, a windowing function is provided for receiving an image at only a partial area of an image sensor depending on the type of image sensor. Therefore, it is possible to detect a fingerprint by selectively acquiring a middle part of an image clearly reflecting the fingerprint when using an image sensor of this kind.

Detection of the existence of a fingerprint is made through the fingerprint detection means. The fingerprint detection means comprises: a calculating means for adding all the sums of the differences between gray levels of adjacent two pixels in an X direction or a Y direction of a coordinate for the acquired image; a comparing means for comparing the added value with a pre-set reference value; and a discriminating means for determining that a fingerprint has been detected when the added value is greater than the reference value.

To be specific, if a fingerprint is clearly detected when an image has been acquired when the backlight is in an "off" state, the gray levels on the X axis (or on the Y axis) is varied in a wide range, and detection of a fingerprint is determined based on that variation. A detected fingerprint is determined to be a latent fingerprint detected due to an external light. The method of detecting a fingerprint image by adding the differences in gray levels of adjacent pixels is a technology that can be easily carried out by one skilled in the art.

In addition to the above method, another method is also applicable for detecting the existence of a fingerprint by adding all the gray levels of each pixel, comparing the added value with a pre-set reference value, and determining that a fingerprint has been detected when the added value is less than the reference value.

Another method is still applicable for detecting the existence of a fingerprint by calculating an average value of the gray levels of pixels of an image and a dispersion value, and determining that a fingerprint has been detected when the average value is less than a first reference value and when the dispersion value is greater than a second reference value. Other methods, including this method, are also well known to those skilled in the art.

When the above method is used, however, an image is acquired without a backlight illuminated onto the imaging surface, and a user is unable to ascertain whether or not the fingerprint input apparatus is in operation. Furthermore, it is possible, though rare, for the latent fingerprint discrimination means to first determine that the fingerprint is not a latent fingerprint in the absence of an incident external light but also to mis-recognize the latent fingerprint as a fingerprint of a biomass when an external light is incident at the moment of illuminating an backlight and acquiring the fingerprint image.

To resolve this problem, another method has been suggested to acquire an image by illuminating a backlight, and when a fingerprint has been detected, switch off the backlight and acquire the image. If a fingerprint is detected under this state, it is determined to be a latent fingerprint. Otherwise, it is determined to be a fingerprint of a biomass.

In this case, the method of discriminating a latent fingerprint from that of a biomass comprises the steps of: illuminating a backlight to the imaging surface and acquiring an image; switching off the backlight and acquiring an image when a fingerprint has been detected from the acquired image; and determining the detected fingerprint is a latent fingerprint detected due to an external light when a fingerprint is detected when the backlight is in the "off" state.

In that case, the apparatus for discriminating between a latent fingerprint and a biomass fingerprint comprises: a backlight control means for controlling the turning on and off of a backlight; an image acquisition means for illuminating the backlight to an imaging surface under a control by the backlight control means to acquire an image; a fingerprint detection means for detecting the existence of a fingerprint from the acquired image; wherein, if the fingerprint detection means has detected a fingerprint, the image acquisition means re-acquires the image without illuminating the backlight onto the imaging surface; and a latent fingerprint determining means for determining a fingerprint, if detected by the fingerprint acquisition means from the re-acquired image, to be a latent fingerprint detected due to an external light.

The methods for acquiring an image in the above method and apparatus can be performed by a method similar to the method used for acquiring an image while the backlight is in the "off" state. The available methods in this regard are to acquire an entire screen of an image or a partial image when a backlight is either illuminated or not illuminated.

The existence of a fingerprint within the acquired image can also be detected by the same method as the one used for detecting a fingerprint from an acquired image as described above.

Also, an image acquired by using a method of receiving an image while switching "on" and "off" the backlight in the course of acquiring the image contains a part acquired under illumination of the backlight and a part acquired while the backlight is in its "off" state in turn. A latent fingerprint can be detected using this method of each part of the image. In other words, it can be determined to be a latent fingerprint if a fingerprint image is detected from the part of the image acquired under illumination of the backlight and a fingerprint image is detected from the part of the image acquired while the backlight is off as well. In the opposite case, it can be determined to be a fingerprint of a biomass if a fingerprint image is detected from the part of the image acquired under illumination of the backlight and no fingerprint image is detected from the part of the image acquired while the backlight is in its "off" state.

BRIEF DESCRIPTION OF THE DRAWINGS

The above and other objects, features and advantages of the present invention will become more apparent from the following description when taken in conjunction with the accompanying drawings, in which.

DETAILED DESCRIPTION OF THE PREFERRED EMBODIMENTS

Figure 4:
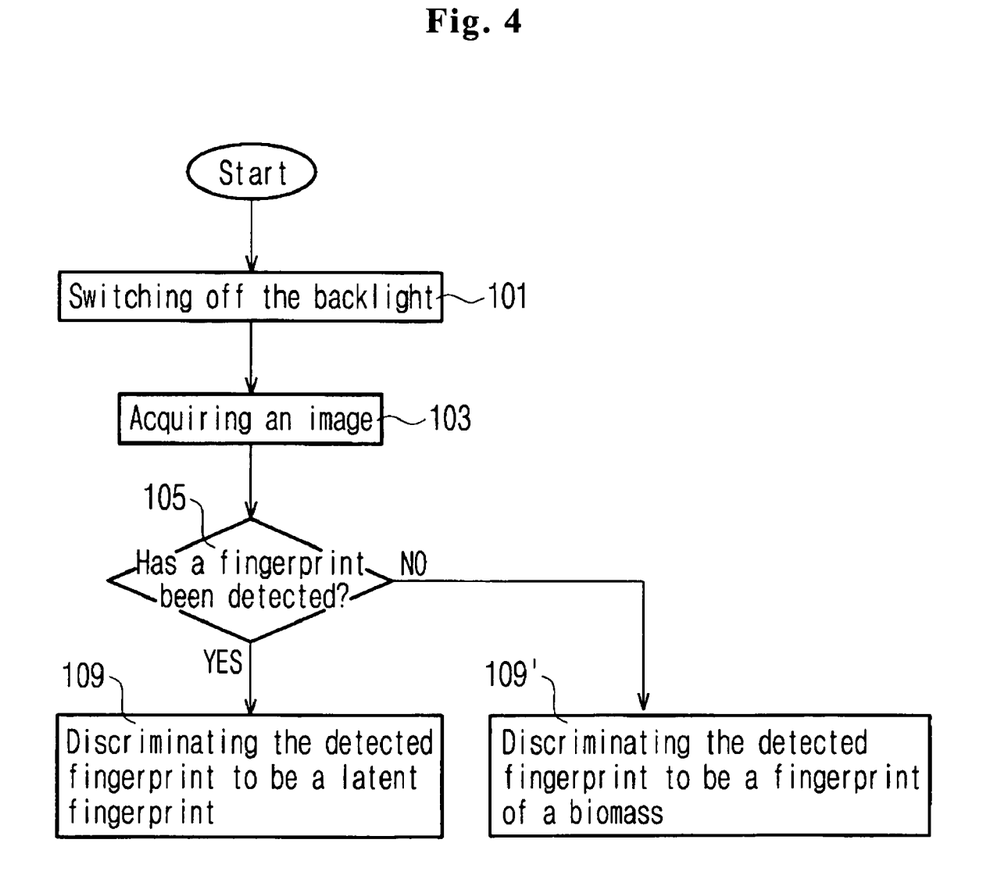
FIG. 4 is a flow chart illustrating a method of discriminating a latent fingerprint from a fingerprint of a biomass according to the present invention.
Figure 12:
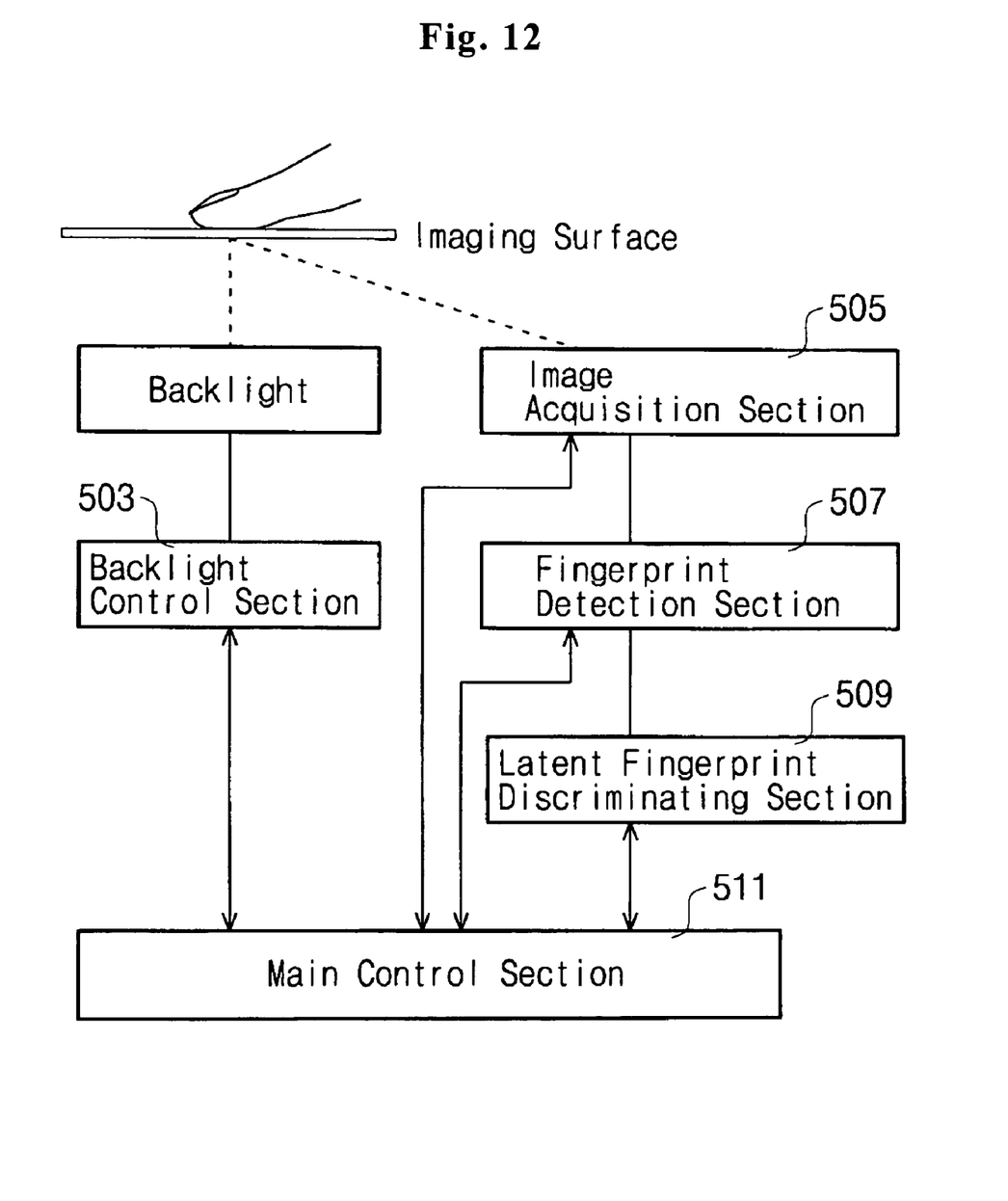
FIG. 12 is a block diagram illustrating a function of an apparatus for discriminating a latent fingerprint from that of a biomass according to the present invention.

The present invention will be described below with reference to the accompanying drawings. In the following description, well-known functions or constructions are not described in detail since they would obscure the invention in unnecessary detail. FIG. 4 is a flow chart illustrating a method of discriminating a latent fingerprint from that of a biomass according to the present invention, and FIG. 12 is a block diagram illustrating a function of an apparatus for discriminating a latent fingerprint from that of a biomass according to the present invention. For the sake of convenience, the description of a method will be made along with an apparatus according to the present invention.

If a person to be authenticated for access touches an imaging surface with one finger, the backlight control means 503 switches off the backlight (S101). The image acquisition means 505 then acquires an image of the fingerprint (S103), and the fingerprint detection means 507 detects the existence of a fingerprint (S105). As described above, if a fingerprint has been detected during the "off" state of the backlight, the latent fingerprint discrimination means 509 determines that a latent fingerprint has been detected due to an external light (S109). If no fingerprint has been detected during the backlights "off" state, the latent fingerprint discrimination means 509 determines the inputted fingerprint to be a fingerprint of a biomass (S109).

Figure 5:
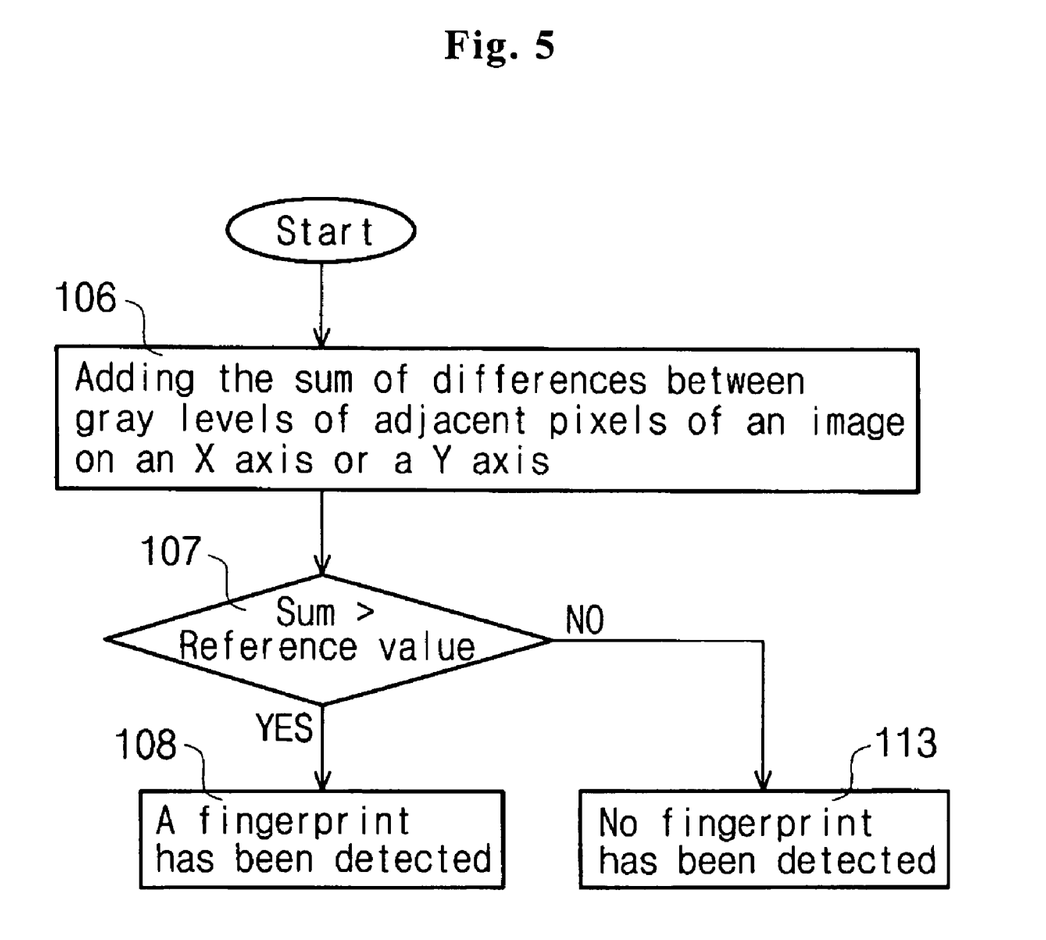
FIG. 5 is a flow chart illustrating a process of determining whether or not a fingerprint exists according to a first embodiment of the present invention.

In step (S105) of detecting a fingerprint, the fingerprint can be detected by adding gray levels of the image as described above. To be specific, differences in gray levels between adjacent pixels of the acquired image on the X-axis or the Y-axis of a coordinate are added, as shown in FIG. 5 (S106).

As the next step, the latent fingerprint discrimination means determines whether the added value is greater or less than a pre-set reference value (S107). If the added value is greater, this means that a fingerprint has been detected while the backlight was in its "off" state, and it is determined that the acquired fingerprint image is a latent fingerprint (S108). If the added value is less than or equal to the pre-set reference value, this means that a fingerprint has not been detected (S113), and it is determined that the acquired fingerprint image is a fingerprint of a biomass.

Figure 6:
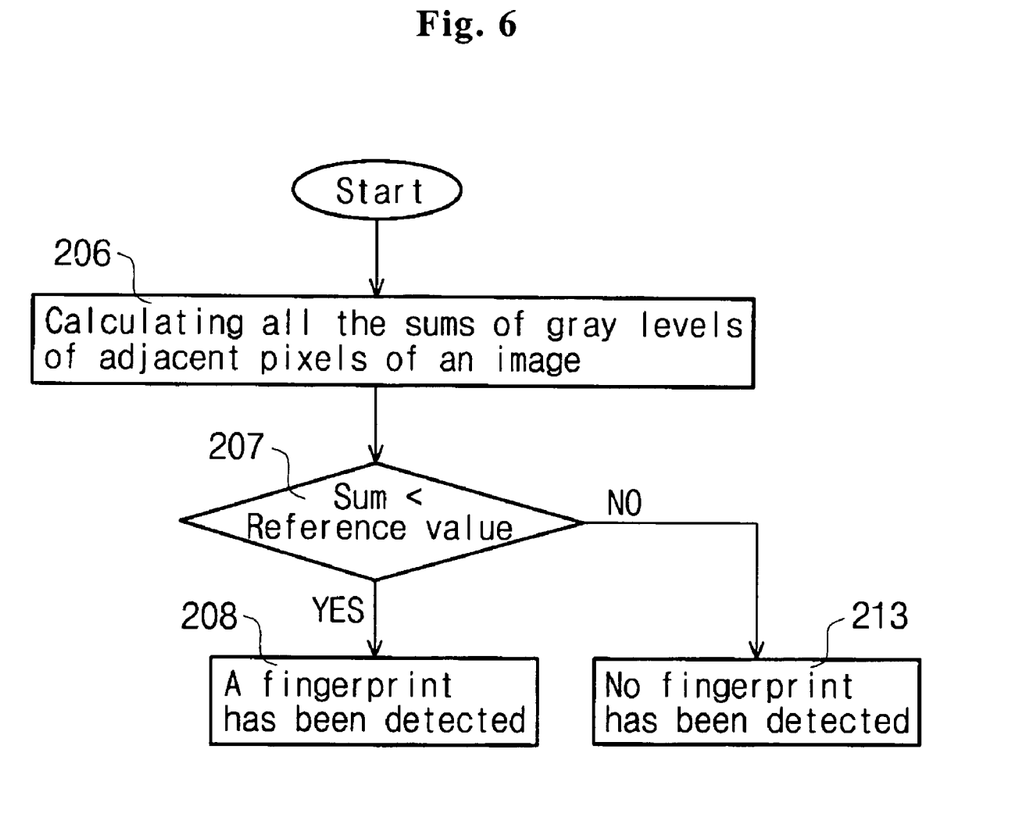
FIG. 6 is a flow chart illustrating a process of determining whether or not a fingerprint exists according to a second embodiment of the present invention.

FIG. 6 is a flow chart illustrating a process of determining whether or not a fingerprint exists according a second embodiment of the present invention. A fingerprint image is acquired by switching off the backlight, and all the gray level values of the pixels of the image are added (S206). If the added value is less than the pre-set reference value, it means that a fingerprint has been detected (S208), and it is determined that the acquired image is a latent fingerprint image.

Figure 7:
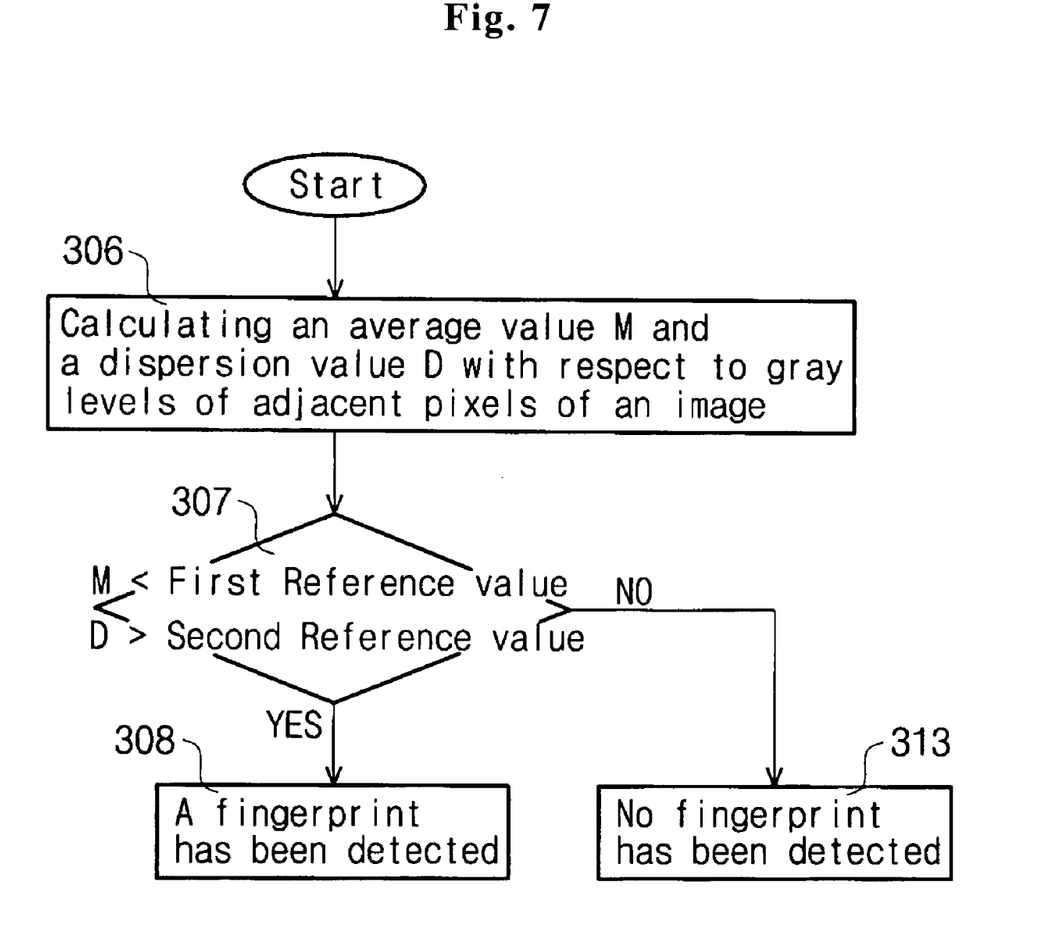
FIG. 7 is a flow chart illustrating a process of determining whether or not a fingerprint exists according to a third embodiment of the present invention.

FIG. 7 is a flow chart illustrating a process of determining whether or not a fingerprint exists according to a third embodiment of the present invention. A fingerprint image is acquired by switching off the backlight, and an average value M as well as a dispersion value D of the gray levels of the pixels of the image is calculated (S306). If it is determined that M is less than a first reference value and that D is greater than a second reference value (S307), it means that a fingerprint has been detected (S308). Therefore, it is determined that the acquired image is a latent fingerprint.

The above embodiment represents a case of distinguishing a latent fingerprint from that of a biomass by acquiring an entire image of a fingerprint. As mentioned above, time is wasted while receiving a frame of the image in this case and time can be saved by acquiring only a part of the image, rather than the entire image, to detect a latent fingerprint while the backlight is in an "off" state.

Figure 8:
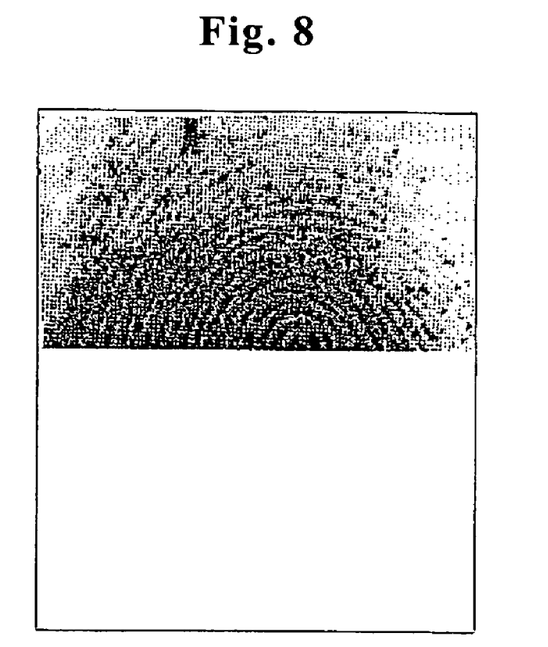
FIG. 8 is an exemplary pattern of a partial image acquired from the tip of a latent fingerprint.

FIG. 8 is an exemplary pattern of a half of the entire image acquired from a latent fingerprint. A latent fingerprint can sufficiently be discriminated from that of a biomass with only about half of the entire fingerprint image. The same method as described above is applied for discriminating a latent fingerprint from that of a biomass.

Figure 9:
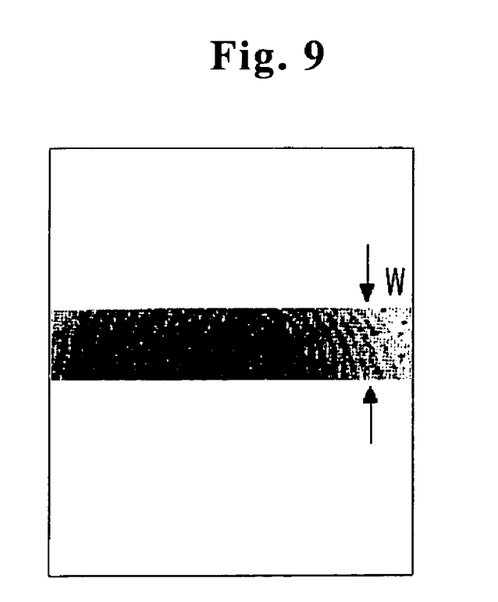
FIG. 9 is an exemplary pattern of a partial image acquired from a latent fingerprint by using a windowing function of an image sensor.

FIG. 9 is an exemplary pattern of a mid-part image acquired from a latent fingerprint by using a windowing function of an image sensor. When using such a windowing function of the image sensor for receiving only a part of an image, the time consumed for receiving the fingerprint image will be reduced as the width W of the window is narrow, and consequently, the time consumed for determining the existence of a latent fingerprint will also be reduced.

Figure 10:
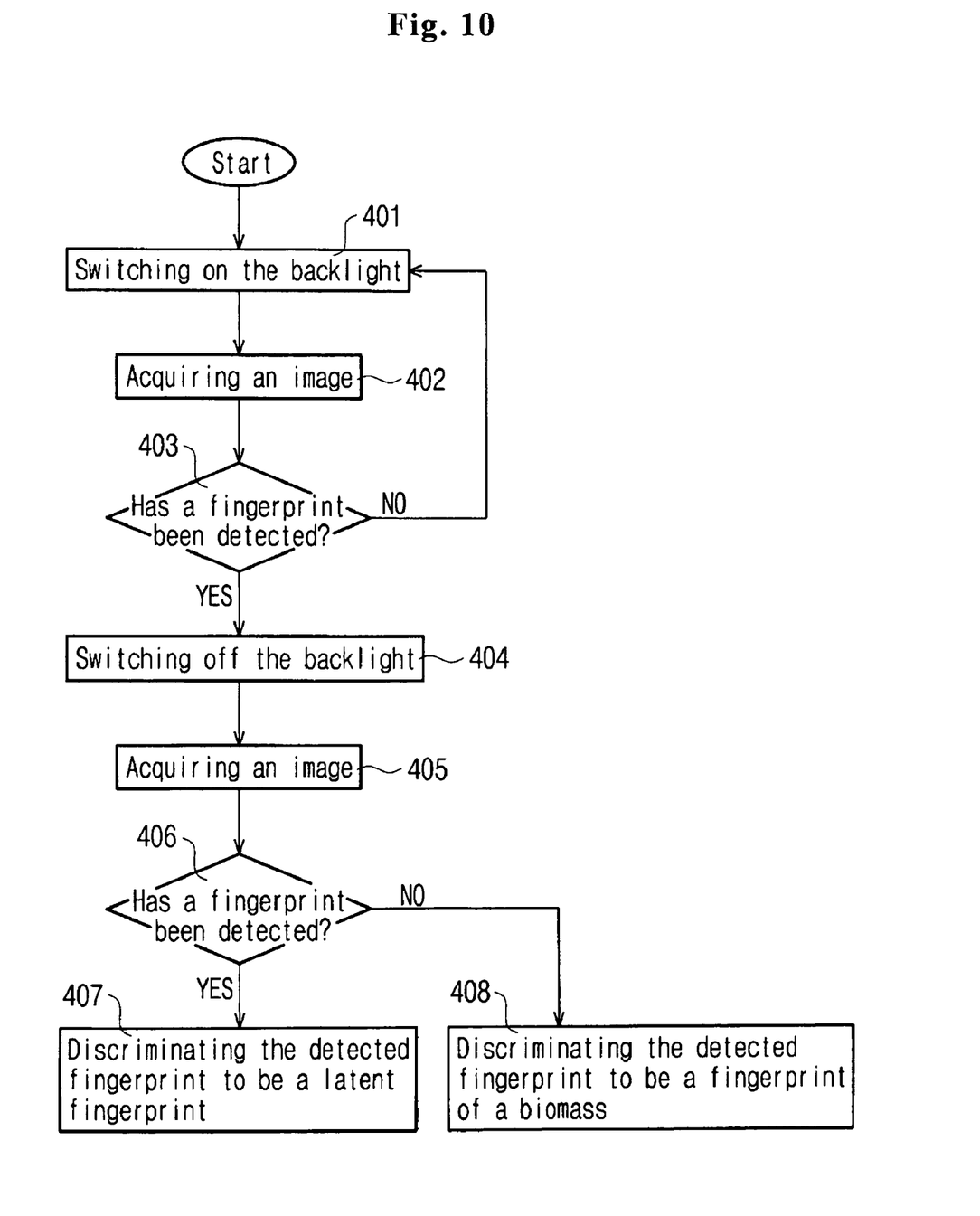
FIG. 10 is a flow chart illustrating a method of discriminating a latent fingerprint from a biomass fingerprint according to a fourth embodiment of the present invention.

FIG. 10 is a flow chart illustrating a method of discriminating a latent fingerprint from that of a biomass according to a fourth embodiment of the present invention. Image acquisition means 505 switches on the backlight under a control by backlight control means 503 (S401) to acquire an image (S402). As the next step, the fingerprint detection means 507 determines whether or not a fingerprint has been detected (S403). In the affirmative, the image acquisition means 505 switches off the backlight under a control by the backlight control means 503 (S404) to acquire an image (S405). The fingerprint detection means 507 then determines whether or not a fingerprint has been detected while the backlight was in its "off" state (S406). In the affirmative, discrimination means 509 determines the detected fingerprint to be a latent fingerprint (S407). In the negative, the discrimination means 509 determines the detected fingerprint to be a fingerprint of a biomass (S408). The same method as shown in FIGS. 5 to 7 is used for detecting a fingerprint according to the fourth embodiment, as in case of the third embodiment.

In the fourth embodiment shown in FIG. 10, an image is acquired while the backlight is in an "on" state to detect the existence of a fingerprint, and the existence of a fingerprint is detected by acquiring an image while the backlight is in an "off" state when a fingerprint has been detected. An image acquired using a similar method of receiving an image while switching on and off the backlight in the course of acquiring the image contains a part acquired under an "on" state of the backlight and a part acquired under an "off" state of the backlight that appear in turn.

Figure 11:
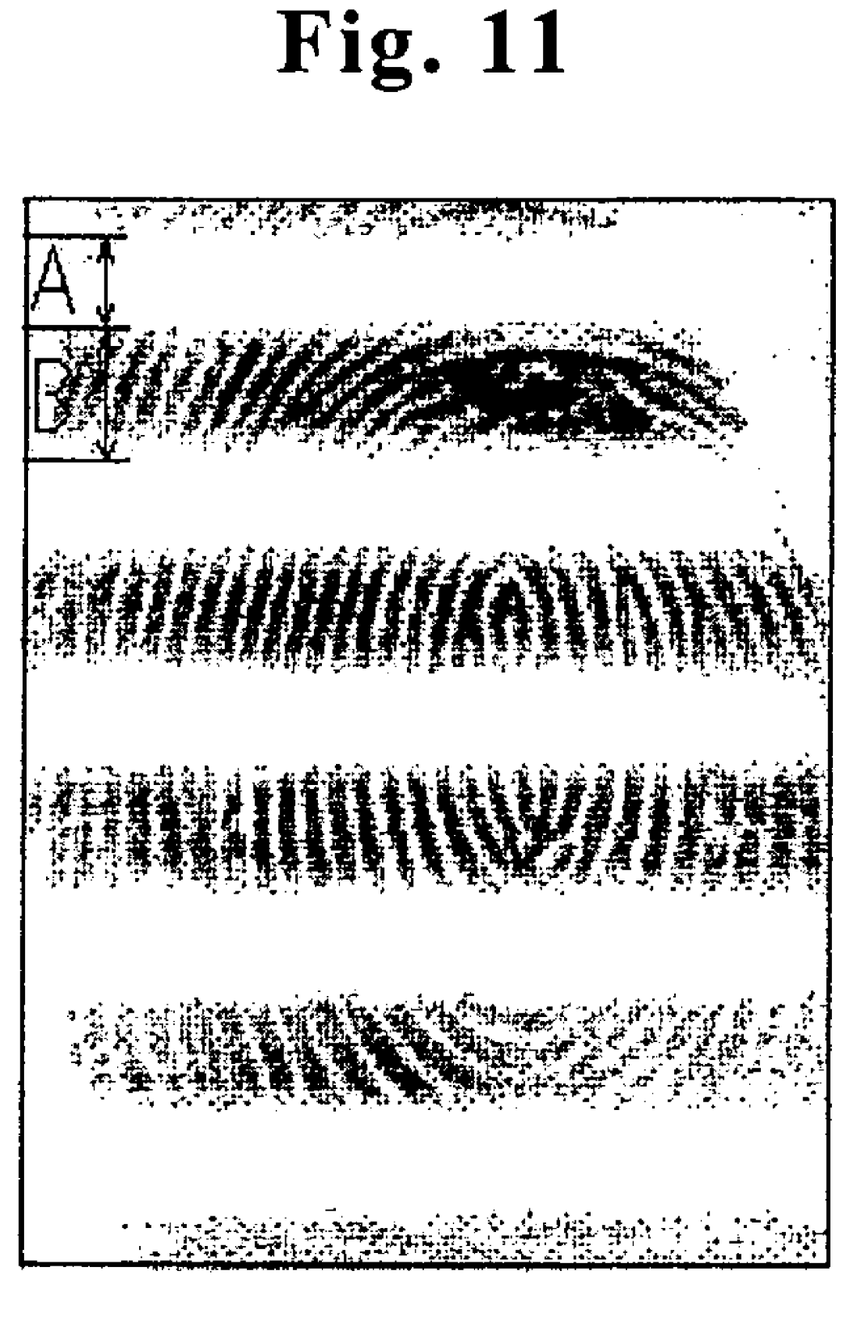
FIG. 11 is an exemplary pattern of a fingerprint image acquired by switching a backlight on and off.

FIG. 11 is an exemplary pattern of a fingerprint image acquired by switching on and off a backlight. Part "A" represents an image acquired under an "off" state of the backlight, while part "B" represents an image acquired under an "on" state of the backlight. As described above, it is determined that an image was acquired from a fingerprint of a biomass because a fingerprint has not been detected in the part "A", which was acquired while the backlight was in the "off" state, but has been detected in the part "B", which was acquired while the backlight was in the "on" state.

It is well known to those skilled in the pertinent art that the switching on and off of the backlight is controlled by software, and that the image part acquired while the backlight was in the "on" state is distinguished from the image part acquired while the backlight was in the "off" state by calculation.

While the invention has been shown and described with reference to certain embodiments to carry out the invention, it will be understood by those skilled in the art that various changes in form and details may be made without departing from the spirit and scope of the invention as defined by the appended claims. The technical concept of the present invention lies in acquiring an image while the backlight was in the "off" state and discriminating a latent fingerprint from a fingerprint of a biomass based on the fingerprint image detected from the acquired image.

What is the claimed is:

1. A method of discriminating a latent fingerprint residual from that of a biomass on an imaging surface of an optical fingerprint input apparatus, which acquires a fingerprint image by a backlight illuminated onto a fingerprint and reflected there from, the method comprising the steps of:
   acquiring an image while switching on and off the backlight onto the imaging surface;
   detecting an existence of a fingerprint with respect to the image part acquired under an "on" state of the backlight;
   detecting the existence of a fingerprint with respect to the image part acquired under an "off" state of the backlight; and
   determining that the fingerprint, if detected from both image parts acquired under the "on" state and "off" states of the backlight, is a latent fingerprint detected due to an external light.

2. The method of claim 1, wherein the step of acquiring an image is performed by receiving either one of:
   an entire screen of an image,
   only a part of an image from the tip thereof or
   only a part of an image by using a windowing function of an image sensor.

3. The method of claim 2, wherein the step of detecting the existence of a fingerprint comprises the sub-steps of:
   calculating a sum of differences between gray levels of adjacent pixels of either one of the acquired images on an X-axis or a Y-axis of a coordinate;
   comparing the calculated sum of the gray levels with a pre-set reference value; and
   determining that a fingerprint has been detected if the sum of the gray levels is greater than the reference value.

4. The method of claim 2, wherein the step of detecting the existence of a fingerprint comprises the sub-steps of:
   calculating a sum of differences between gray levels with respect to either one of the acquired images;
   comparing the calculated sum of the gray levels with a pre-set reference value; and
   determining that a fingerprint has been detected if the sum of the gray levels is less than the reference value.

5. The method of claim 2, wherein the step of detecting the existence of a fingerprint comprises the sub-steps of:

calculating an average value and a dispersion value of gray levels with respect to either one of the acquired images; and determining that a fingerprint has been detected if the calculated average value is less than a first reference value and the calculated dispersion value is greater than a second reference value.

6. An apparatus for discriminating a latent fingerprint residual from that of a biomass on an imaging surface of an optical fingerprint input apparatus, which acquires a fingerprint image by a backlight illuminated onto a fingerprint and reflected there from, the apparatus comprising:

a backlight control means for controlling switching on and off of the backlight;

an image acquisition means for acquiring an image while switching on and off the backlight onto the imaging surface;

a fingerprint detection means for detecting an existence of a fingerprint with respect to the image parts acquired under an "on" state of the backlight and under an "off" state of the backlight, respectively; and a means for determining that the fingerprint, if detected from both image parts acquired under the "on" and "off" states of the backlight, is a latent fingerprint detected due to an external light.

7. The apparatus of claim 6, wherein the image acquisition means receives either one of;

an entire screen of an image, only a part of an image from the tip thereof or only a part of an image by using a windowing function of an image sensor.

8. The apparatus of claim 7, wherein the fingerprint detection means comprises:

a calculating means for adding differences between gray levels of adjacent pixels of either one of the acquired images on an X-axis or a Y-axis of a coordinate;

a comparing means for comparing the added value with a pre-set reference value; and a means for determining that a fingerprint has been detected if the added value is greater than the pre-set reference value.

9. The apparatus of claim 7, wherein the fingerprint detection means comprises:

a calculating means for adding gray levels with respect to either one of the acquired images;

a comparing means for comparing the added value with a pre-set reference value; and a means for determining that a fingerprint has been detected if the added value is less than the pre-set reference value.

10. The apparatus of claim 7, wherein the fingerprint detection means comprises:

a calculating means for calculating an average value and a dispersion value of gray levels with respect to either one of the acquired images; and a means for determining that a fingerprint has been detected if the calculated average value is less than a first reference value and the calculated dispersion value is greater than a second reference value.

* * * * *